C. DE MARCO.
COMBINATION ILLUMINATING LIGHT AND CAMERA.
APPLICATION FILED NOV. 13, 1916.

1,272,635.

Patented July 16, 1918.
2 SHEETS—SHEET 1.

Witness
Eric Sochinger.

Inventor
Charles De Marco
By Frank Keifer
Attorney

C. DE MARCO.
COMBINATION ILLUMINATING LIGHT AND CAMERA.
APPLICATION FILED NOV. 13, 1916.
1,272,635.
Patented July 16, 1918.
2 SHEETS—SHEET 2.
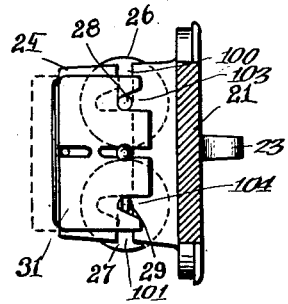
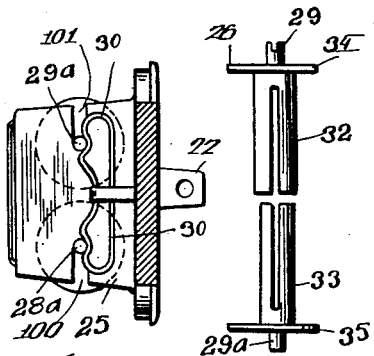
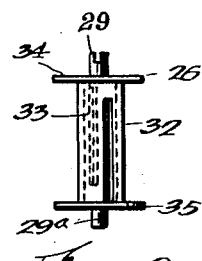
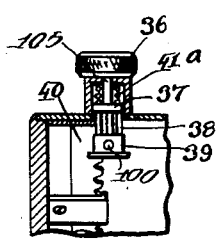
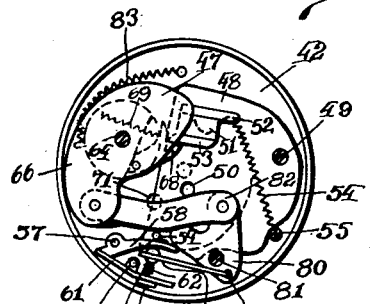

UNITED STATES PATENT OFFICE.

CHARLES DE MARCO, OF ROCHESTER, NEW YORK.

COMBINATION ILLUMINATING-LIGHT AND CAMERA.

1,272,635.

Specification of Letters Patent.   Patented July 16, 1918.

Application filed November 13, 1916.   Serial No. 131,101.

*To all whom it may concern:*

Be it known that I, CHARLES DE MARCO, a citizen of the United States, residing at Rochester, in the county of Monroe and State of New York, have invented certain new and useful Improvements in Combination Illuminating-Lights and Cameras, of which the following is a specification.

The object of this invention is to provide illuminating light and a film camera in the same structure and form of a revolver.

Another object of the invention is to provide for the simultaneous or the independent use of the illuminating light and camera so that the outfit may be used for taking pictures either by daylight or in the dark.

These and other objects of the invention will be illustrated in the drawings, described in the specification and pointed out in the claims at the end thereof.

In the drawings,

Figure 1 is a side elevation of my improved camera with the casing partly broken away.

In this figure the illuminating light attachment is shown in position to cover the camera lens.

Fig. 5 is a top plan view of the film holding device.

Fig. 6 is a bottom plan view of the film holding device.

Fig. 7 is a detail view of the spool with the two sections thereof drawn apart.

Fig. 8 is a detail view of the spool with the sections pressed together.

Fig. 9 is a section through the winding key for the film, the section being taken on the line 9˟—9˟ of Fig. 2.

Fig. 10 is an end elevation of the shutter mechanism.

Fig. 11 is a detail view of one of the shutters.

Fig. 12 is a detail view of the second shutter.

Fig. 13 is a detail view of the button for releasing the shutter in making a time exposure, and the mechanism for making a snap shot.

Fig. 14 is a detailed perspective view of the connection between the handle and the cylinder of the camera, the parts being partly broken away.

Fig. 15 is a plan view of the shutter disks which operate to open and close the exposure opening.

Fig. 16 is a section through the push button for operating the incandescent flash light.

In the accompanying drawings like reference numerals indicate like parts.

Figure 1:
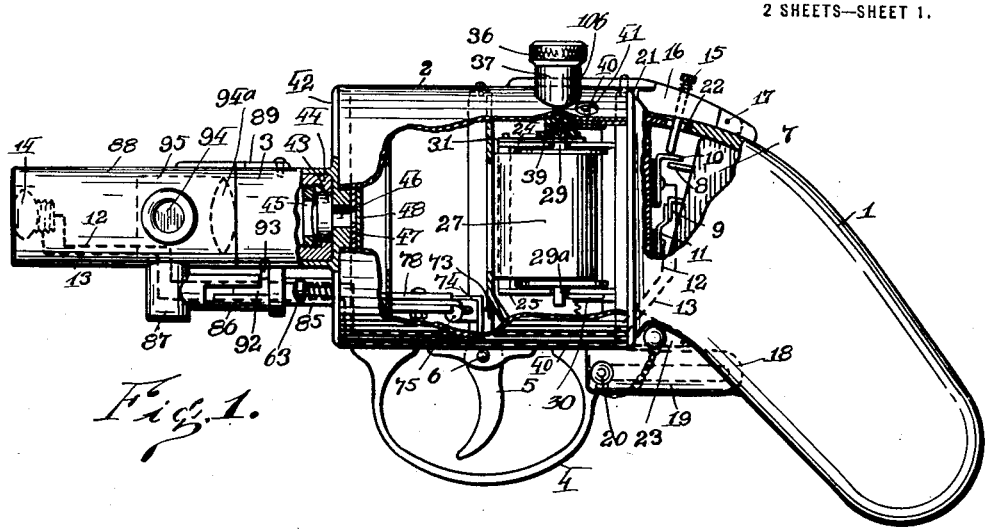

In the drawings reference numeral 1 indicates the handle of the camera having cylindrical portion 2 and a barrel 3. Under the cylindrical portion is a trigger guard 4 in which is pivotally mounted a trigger 5, which trigger is pivoted at 6 in the cylindrical casing.

The handle of the camera is hollow and in it is contained the battery 7 having the terminals 8 and 9 therein which terminals are adapted to make contact with the terminals 10 and 11, which terminals are insulated from the body or frame of the camera. From the terminals 10 and 11 two wires 12 and 13 lead forward to the bottom of the cylinder and through the barrel in the end of which it makes contact with the illuminating light 14.

The circuit between the contact 9 and 11 is normally closed and the circuit between the contact 8 and 10 is normally open. The contact 10 is a spring contact which may be pressed into engagement with the contact 8 by means of the pin 15 which is mounted in a latch 16 which is pivoted on the handle at 17 and which pin is insulated in the latch from the camera structure.

Mounted on the underside of the barrel and extending rearward from the trigger guard 4 is a guide 18. Mounted on the under side of the handle and extending forward on both sides of the trigger guard 18 are two lugs 19. Passing through the lugs 19 and engaging with the slots in the guide 4 is the pin 20.

Inside of the cylinder 2 is placed a cover plate 21 from which extends rearwardly a lug 22 in the top thereof and a lug 23 at the bottom thereof. The lug 23 engages with the handle 1 at the bottom thereof where it is suitably perforated for the purpose. The lug 22 engages with the handle 1 at the top where it is also suitably slotted for that purpose. The lug 22 has a large opening therein through which the pin 15 extends which opening provides ample clearance between the pin and the lug so that the battery will not be short circuited thereby.

The contacts 10 and 11 are carried on the back of the plate 21 from which they are suitably insulated.

On the forward side of the plate 21 is arranged the film holder which comprises two parallel flanges or plates 24 and 25 between which are mounted the spools 26 and 27 carried on the pins 28 and 29 which pins engage suitable slots 100 and 101 in the plates 24 and 25. On the lower side the pins 28 and 29 are locked in place by a friction spring 30 and on the upper plate they are locked in place by the keeper 31, which has recesses 103 and 104 therein to engage the pins 28 and 29 when the keeper is pressed down to the position shown in full lines in Fig. 5 but which releases the pins when the keeper is drawn up to the dotted line position shown in Fig. 5. When the keeper is drawn to the dotted line position shown in Fig. 5 the pins 28 and 29 can be moved sidewise out of engagement with the plates 24 and 25 permitting the removal of the film spools from the holder.

In Figs. 7 and 8 I have shown the construction of one of the spools for winding the film. This spool is made of two sections 32 and 33, the section 32 being larger and tubular and being adapted to telescope on the section 33. Both of these sections have flanges 34 and 35 thereon and have pins 29 and 29ª projecting therefrom pin 29 being slotted across the end so that they can be engaged by the winding device.

When a film is threaded into the film holder the end of it is passed through the slot in the cylindrical section 33 and the section 32 is then brought down into engagement therewith and the one section is then turned several degrees on the other which causes the two sections to engage the end of the film between them and positively grip it to the spool.

For the purpose of turning the film when the holder is placed in the camera I provide the knurled wheel 36 which is mounted on a pin 105 which passes through a cup 37 arranged on the cylindrical part of the camera, on the inner side of which is provided an elongated pinion 38, on the bottom of which is a cup 39 having a pin 106 extending thereacross, which pin can engage with the slotted end of the pin of one of the spools, so that by turning the wheel 36 the spool will be rotated and the film will be advanced.

Mounted inside of the cylinder 2 is an angular rack 40 having teeth thereon which engage with the teeth of the elongated pinion 38 which rack will be turned by the turning of the knurled wheel 36 see Fig. 9. On the body of the rack 40 is carried a series of numbers which are exposed in succession through a side opening 41 in the cylinder see Fig. 1, which figures will show successively where the film should be stopped so that successive exposures will be made. The knurled wheel 36 is normally held in the position shown in Fig. 9 by the spring 41ª in which position the pin in the cup 39 engages the slotted pin 28 as shown in Fig. 1 and from this position it may be withdrawn by pulling the knurled wheel up whereupon the spool will be released from the engagement with the turning device and the spool holder may be removed.

Fastened in the front of the cylinder is the plate 42 on which is carried the lens 43 and shutter. The lens is held in a cell 44 by the screw collar 45. Back of the lens is the opening 46 through which the light passes to the film. The passage of the light through this opening is controlled by the two shutters 47 and 48, the construction and operation of which will now be described.

48 indicates the shutter for time exposure and 47 indicates the shutter which, together with 48, is used for snap shots. The shutter 48 is pivoted at 49. It has an opening 50 therein and which is adapted to register with the opening 46 for time exposure. On the shutter 48 is a block 51 on one side of which is fastened an arm 52 and on the other side of which is fastened a plate 53. To the arm 52 is fastened a spring 54 which spring is also fastened to a pin 55 in the plate 42 by which spring the shutter is operated in one direction.

Figure 4:
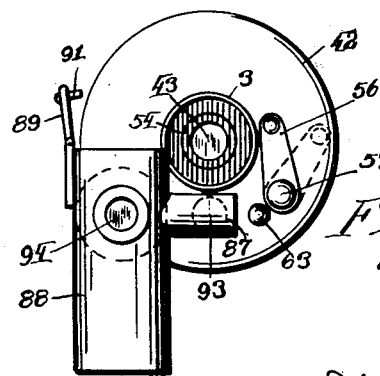
Fig. 4 is a front elevation of the part shown in Fig. 3.

Mounted on the outside of the plate 42 is the lever 56, which lever is mounted on a pin 57 to the inner end of which is attached a dog 58. When the lever 56 is moved from the full line to the dotted line position shown in Fig. 4 it moves the dog 58 shown in Fig. 10 up at the right hand end. This dog engages with the pin 59 and swings the shutter 48 until the opening 50 registers with the opening 46. While the shutter remains in this position a time exposure can be made. The shutter will be held in this position as follows: Mounted on the inside of the plate 42 is the lug 60 on which is pivotally mounted the dog 61. On the forward end the dog 61 is hook shaped and this hook shaped end normally rests on top of the left hand end of the dog 58 and when the dog 58 is swung from position shown in Fig. 10 the hook shaped end of the dog 61 drops down behind the left hand end of the dog 58 and locks it in position. The dog 61 is turned by the spring 62 to make this engagement. On the dog 61 is provided the lug 62ª with which engages the pin 63 by pressing which pin the dog 61 is rocked to release the dog 58. After the shutter 48 has been set for a time exposure the pin 63 can be pressed to release the dog 58 and permit the shutter 48 to be drawn back by the spring 54, closing the opening and finishing the exposure.

The mechanism by which a snap shot exposure is secured will now be described. The shutter 47 is pivotally mounted on the pin 64. The shutter 47 is made up of two plates 65 and 66, spaced apart by a plate 67. The plate 67 is recessed to receive the dog 68 which is pivotally mounted therein and which is normally pressed outward by the spring 69. The plate 65 has two openings therein, 71 and 72. For a time exposure the opening 72 is in line with the opening 46, and during a time exposure the shutter 47 remains stationary but for a snapshot the exposure is made through the openings 71 in the shutter 47 and through the opening 50 in the shutter 48.

For a snapshot exposure the shutter is moved by the trigger 5. This trigger at its upper end has a lug 73 thereon which bears against the plate 74. This plate is pivotally mounted at 75 on the bell crank 76 which bell crank in turn is pivotally mounted at 77 in the stud 78. On the far end of the bell crank is connected a link 79 which engages with the bell crank 80 pivoted on the stud 81. To one arm of the bell crank 80 is connected a link 82, the opposite end of which link is connected to the plate 66 of the shutter 47 at the pin 82. When the trigger 5 is pulled the shutter 47 is rocked, causing the opening 72 to move away from the opening 46, bringing the opening 71 into line with the opening 46. At the same time, the dog 68 moves with the shutter 47 and engages the under side of the plate 53 on the shutter 48, carrying the shutter 48 up with it. As the shutter 47 moves up with the shutter 48 the dog 68 gradually swings away from the edge of the plate 53 until the plate 53 is released from it, whereupon the shutter 48 will be thrown back to its initial position by the spring 54. When the shutter 48 is tripped to begin its return movement the opening 71 of the shutter 47 is in line with the opening 46, and as the shutter 48 swings, the opening 50 therein passes the opening 71 with a quick movement, permitting the light to pass through both the openings for an instant. When the trigger is drawn the shutter 47 is swung, stretching the spring 83, and when the trigger is released the spring 83 contracts, drawing the shutter back to its initial position.

The plate 42 is provided with a stud 85 on which is mounted to telescope the sleeve 86. This sleeve 86 carries at its forward end a lug 87 to which is fastened the forward end 88 of the barrel 3. The forward end 88 of the barrel 3 is held in line with the remainder of the barrel 3 by means of the dog 89, one end of which is fastened to the outer portion 88 and the other end of which engages the opening 90 in the inner end of the barrel 3 by means of the pin 91.

Figure 2:
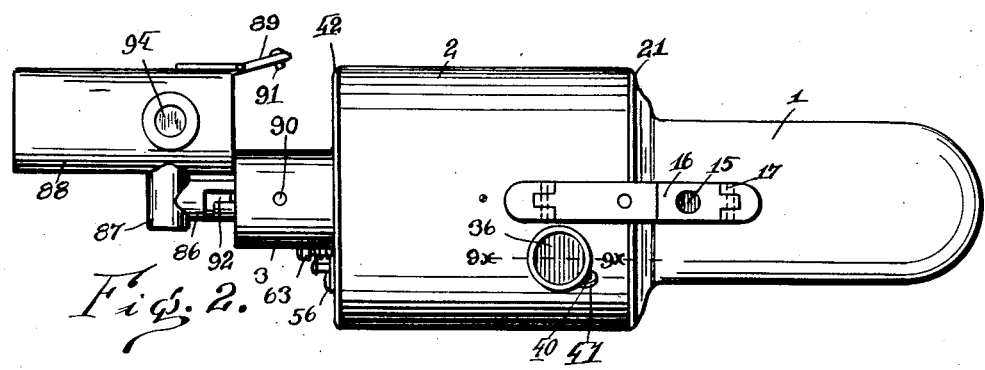
Fig. 2 is a top plan view of the camera with the illuminating light attachment swung to one side to expose the camera lens.
Figure 3:
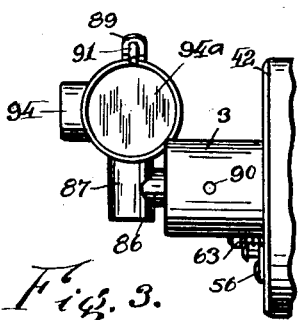
Fig. 3 is a top plan view of the forward end of the camera with the illuminating light attachment swung to position in which it can be used as a finder.

When it is desired to uncover the lens opening of the camera the pin 91 is lifted out of engagement with the opening 90 in the barrel 3 so that the outer portion 88 can be swung to the left around the stud 85 to the position shown in Fig. 2. While in this position the shutter of the camera may be operated and a picture may be taken. The forward end of the portion 88 of the barrel 3 is provided with an illuminating light 14, and by pressing the pin 15 any object of which a picture is desired may be illuminated in the dark while the camera is operated to make an exposure of this object. However, it will be understood that no instantaneous exposure can be made of any object that is illuminated by this light alone. For this reason the camera must be laid on a suitable pedestal or must be fixed to a stationary support while a picture is taken of an object located in the dark and illuminated only by the light from the camera. When the camera is used for taking pictures in daylight the front of the barrel 3 is moved from the position shown in Fig. 2 to the position shown in Figs. 3 and 4. For this purpose the front of the barrel 3 is pivoted on the lug 87 so that it can be moved into a position at right angles to the remainder of the barrel 3.

As shown in Fig. 1 the sleeve 86 is provided with a cam slot 92 into which projects the pin 93 provided in the stud 85. This slot guides the movement of the front of the barrel 88 through the sleeve 86 to the left into the position shown in Fig. 2 after which the front of the barrel may be turned around its pivot in the lug 87 and then moved back toward the plate 42 where it will be held against rotation by the pin 93.

Provided in the rear end of the front 88 of the barrel 3 is a finder which comprises a lens 94 mounted on the side of the barrel and the lens 94$^a$ mounted in the end of the barrel. A mirror 95 is provided on the inside of the barrel which mirror is mounted at the proper angle to throw the image of the object to which the lens 94 is pointed through the lens 94$^a$.

By means of this finder any object may be properly focused through the finder before an exposure is made with the camera.

I claim:

1. A revolver frame having a cylinder handle and barrel portions, a camera having an exposure opening mounted in the cylinder portion, an illuminating light mounted in the front of the barrel and a battery carried in the handle, 2. A revolver frame having a cylinder, handle and barrel portions, a camera having an exposure opening mounted in the cylinder portion, an illuminating light mounted in the front of the barrel and a battery carried in the handle, said illuminating light being mounted to swing toward and away from the exposure opening of the camera.

3. A revolver frame having a cylinder portion and a barrel portion, said camera having a lens carried in the barrel of the revolver frame, a shutter mounted back of said lens, a trigger mounted in said revolver frame for operating said shutter, a finder mounted in the barrel of said frame, means for adjusting said finder with regard to the lens of the camera.

4. The combination of a revolver frame having a camera mounted therein, said camera having a lens at the front thereof, an illuminating light mounted in front of said lens, said illuminating light being mounted to swing from the front of said lens to uncover said lens and move to a position parallel to and in at the side of lens of said camera, a battery for lighting said illuminating light.

5. The combination of a revolver frame, of an illuminating light mounted in the end of the barrel thereof, a camera mounted in the cylinder thereof and a battery for lighting said illuminating light mounted in the handle thereof, a contact button mounted on top of the handle of said frame for operating said illuminating light and a trigger below the cylinder of said frame for operating said camera, said illuminating light and said camera being adapted to operate simultaneously to facilitate the taking of pictures in the dark.

6. The combination of a revolver frame having a camera mounted therein, said camera having a lens at the front thereof, a tube mounted in front of said lens, said tube being mounted to swing from the front of said lens to uncover said lens and move to a position at right angles to said lens, a finder contained in said tube.

7. A revolver frame having a cylinder portion, a plate at the front of said cylinder portion closing the end thereof, a lens and shutter carried on said plate, means for detachably fastening said plate to said cylinder.

8. A revolver frame having a cylinder portion, a plate at the back of said cylinder portion closing the end thereof, a handle fastened to said plate, means for detachably fastening said plate to said cylinder portion.

In testimony whereof I affix my signature in presence of a witness.

CHARLES DE MARCO.

Witness:
ELEANOR M. CORCORAN.